United States Patent [19]
Wentzel et al.

[11] Patent Number: 5,932,961
[45] Date of Patent: Aug. 3, 1999

[54] CLOSED-LOOP TUBULAR LAMP ENVELOPE AND METHOD OF MANUFACTURE

[75] Inventors: David C. Wentzel, Brookline, N.H.; Gregory Zaslavsky, Marblehead; Joseph V. Lima, Salem, both of Mass.

[73] Assignee: Osram Sylvania Inc., Danvers, Mass.

[21] Appl. No.: 08/938,114

[22] Filed: Sep. 26, 1997

Related U.S. Application Data

[62] Division of application No. 08/650,245, May 22, 1996, Pat. No. 5,722,549.

[51] Int. Cl.⁶ .............................. H01J 1/62; H01J 63/04; H01J 17/16; H01J 61/30
[52] U.S. Cl. ............................................ 313/493; 313/634
[58] Field of Search .............................. 313/491–92, 493, 313/573, 634–37, 490, 638–39; 315/248, 344, 160–61

[56] References Cited

U.S. PATENT DOCUMENTS

| | | | |
|---|---|---|---|
| 2,392,785 | 1/1946 | Thomas | 313/634 |
| 3,500,118 | 3/1970 | Anderson . | |
| 3,987,334 | 10/1976 | Anderson . | |
| 4,121,132 | 10/1978 | Repsher | 313/493 X |
| 5,105,118 | 4/1992 | Shinada et al. | 313/634 X |
| 5,124,618 | 6/1992 | Ohtaka et al. | 313/493 X |
| 5,723,939 | 3/1998 | Okuno et al. | 313/493 |

FOREIGN PATENT DOCUMENTS

| | | |
|---|---|---|
| 7-94151 | 4/1995 | Japan . |
| 7-94152 | 4/1995 | Japan . |

OTHER PUBLICATIONS

Anderson, John M., Electrodeless Fluorescent Lamps Excited by Solenoidal Electric Fields, Illuminating Engineering (Apr. 1969), pp. 236–244.

*Primary Examiner*—Sandra O'Shea
*Assistant Examiner*—Mack Haynes
*Attorney, Agent, or Firm*—Carlo S. Bessone

[57] ABSTRACT

A closed-loop, tubular lamp envelope and methods of manufacturing closed-loop, tubular lamp envelopes are disclosed. A dome is formed at one end of a light-transmissive tube. A blister is molded on the dome, and a hole is formed in the molded blister. Next, a dome is formed at the other end of the light-transmissive tube. A blister is formed on the dome, and a second hole is formed in the molded blister. Each of the molded blisters includes a rim which defines the respective hole. A second tube is processed in the same way. The respective rims at the ends of the first and second tubes are fused together to form a sealed, closed-loop lamp envelope. Each tube may be bent to provide a desired shape of the lamp envelope. The molding of the rims insures that the sealing surfaces match.

3 Claims, 4 Drawing Sheets

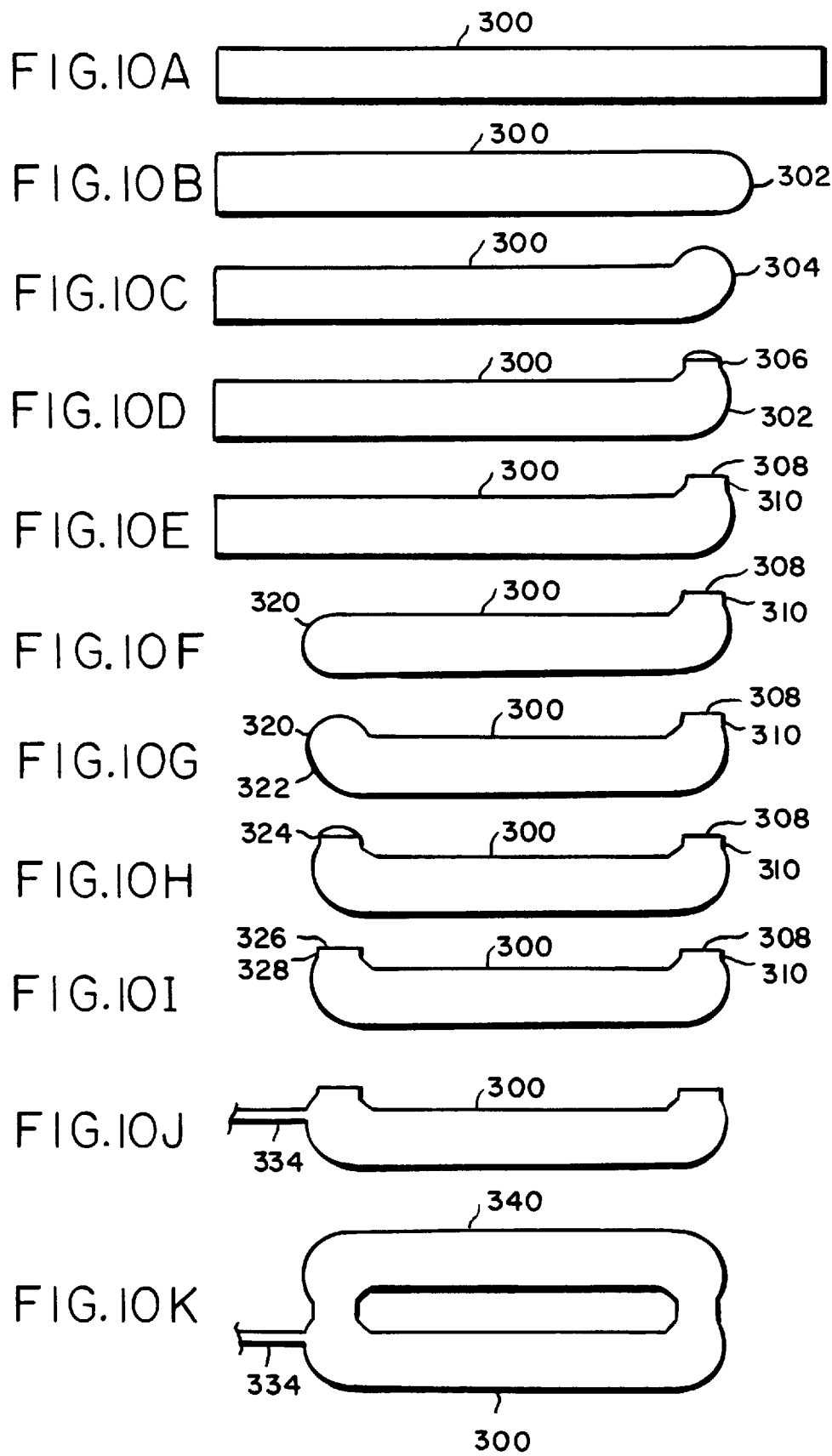

CLOSED-LOOP TUBULAR LAMP ENVELOPE AND METHOD OF MANUFACTURE

This application is a division of application Ser. No. 08/650,245 filed May 22, 1996, U.S. Pat. No. 5,722,549.

FIELD OF THE INVENTION

This invention relates to electrodeless low pressure light sources and, more particularly, to a closed-loop, tubular lamp envelope and methods of manufacturing closed-loop, tubular lamp envelopes.

BACKGROUND OF THE INVENTION

Electrodeless fluorescent lamps are disclosed in U.S. Pat. No. 3,500,118 issued Mar. 10, 1970 to Anderson; U.S. Pat. No. 3,987,334 issued Oct. 19, 1976 to Anderson; and Anderson, *Illuminating Engineering*, April 1969, pages 236 to 244. An electrodeless, inductively-coupled lamp, as disclosed in these references, includes a low pressure mercury/buffer gas discharge in a discharge tube which forms a continuous closed electrical path. The path of the discharge tube goes through the center of one or more toroidal ferrite cores such that the discharge tube becomes the secondary of a transformer. Power is coupled to the discharge by applying a sinusoidal voltage to a few turns of wire wound around the toroidal core that encircles the discharge tube. A current through the primary winding creates a time-varying magnetic flux which induces along the discharge tube a voltage that maintains the discharge. The inner surface of the discharge tube is coated with a phosphor which emits visible light when irradiated by photons emitted by the excited mercury atoms. The lamp parameters described by Anderson produce a lamp which has high core loss and is therefore extremely inefficient. In addition, the Anderson lamp is impractically heavy because of the ferrite material used in the transformer core.

An electrodeless lamp assembly having high efficiency is disclosed in U.S. application Ser. No. 08/624,043 filed Mar. 27, 1996. The disclosed lamp assembly comprises an electrodeless lamp including a closed-loop, tubular lamp envelope enclosing mercury vapor and a buffer gas at a pressure less than about 0.5 torr, a transformer core disposed around the lamp envelope, an input winding disposed on the transformer core and a radio frequency power source coupled to the input winding. The radio frequency source supplies sufficient radio frequency energy to the mercury vapor and the buffer gas to produce in the lamp envelope a discharge having a discharge current equal to or greater than about 2 amperes. The disclosed lamp assembly achieves relatively high lumen output, high efficacy and high axial lumen density simultaneously, thus making it an attractive alternative to conventional VHO fluorescent lamps and high intensity, high pressure discharge lamps.

Electrodeless lamps of the type described above require a closed-loop, tubular lamp envelope. The lamp envelope is hollow and forms a closed-loop but may have a variety of different shapes. The aforementioned U.S. Pat. No. 3,500, 118 discloses an oval shaped lamp envelope. A toroidal lamp envelope having a constricted section for ferrite placement is disclosed in the aforementioned U.S. Pat. No. 3,987,334. Japanese Document No. 7-94152 discloses electrodeless lamp envelopes of various shapes, wherein two halves are joined in two places to form a ring.

Insofar as known to applicant, the prior art does not disclose a method for making a closed-loop, tubular lamp envelope that is suitable for automated manufacturing. All known shapes of such closed-loop lamp envelopes are very specific, as is the process for making them. As a result, lamp manufacturing equipment would be expensive and inflexible. It would be impossible to accommodate different glass and lamp sizes, as well as different shapes, utilizing one production line. For example, the aforementioned Japanese Doc. No. 7-94152 discloses the joining of formed glass tubes at abutting tube ends. While this approach is generally feasible in a laboratory environment, the process would be very expensive and impractical in a production environment.

SUMMARY OF THE INVENTION

According to the present invention, a method for fabricating a closed-loop lamp envelope is provided. A dome is formed at one end of a light-transmissive tube. A blister is molded on the dome, and a hole is formed in the molded blister. Next, a dome is formed at the other end of the light-transmissive tube. A blister is formed on the dome, and a second hole is formed in the molded blister. Each of the molded blisters includes a rim which defines the respective hole. A second tube is processed in the same way. The respective rims at the ends of the first and second tubes are fused together to form a sealed, closed-loop lamp envelope. When the lamp envelope is used in a fluorescent light source, inside surfaces of the first and second tubes are coated with a phosphor material.

The light-transmissive tube may be bent in one or more places to form a desired shape of the lamp envelope. The rims at the ends of the glass tubes form matching half bridges for joining the first and second tubes. According to another aspect of the invention, a method for connecting glass tubes is provided. The method comprises the steps of forming a dome at one end of a first glass tube, molding a blister having a rim on the dome, and forming a hole in the molded blister. The hole is defined by the rim. A second glass tube is processed in the same way. The first and second glass tubes are joined at the rims to form a sealed connection between the first and second glass tubes.

According to a further aspect of the invention, a method for processing a glass tube for connection to another glass tube is provided. The method comprises the steps of forming a dome at one end of a glass tube, molding a blister having a rim on the dome, and forming a hole in the molded blister. The hole is defined by the rim. The rim is adapted for connection to another glass tube having the same configuration.

According to a further aspect of the invention, a closed-loop, tubular lamp envelope is provided. A first light-transmissive tube has first and second domes at opposite ends thereof. The first and second domes of the first tube include first and second rims defining first and second holes, respectively. A second light-transmissive tube has third and fourth domes at opposite ends thereof. The third and fourth domes of the second tube include third and fourth rims defining third and fourth holes, respectively. The first and third rims are joined, and the second and fourth rims are joined such that the first and second tubes form a sealed closed-loop, tubular lamp envelope. In a preferred embodiment, the first and second tubes have straight portions and are joined together by matching half bridges.

BRIEF DESCRIPTION OF THE DRAWINGS

For a better understanding of the present invention, reference is made to the accompanying drawings, which are incorporated herein by reference and in which:

FIGS. 10A–10K illustrate the glass tube following the individual steps of the process of FIG. 9.

A closed-loop, hollow, tubular glass envelope is produced by shaping and processing of tube sections that are then fused together at well-defined sealing surfaces. The process typically involves prefabrication of two sections, but is not limited to two sections. The tube sections are made to a tight tolerance to be sure that the sealing surfaces match. The final lamp envelope must be reliably sealed, must be relatively rugged and must have a long operating life. Reproducibility and high process yield depend on achievement of a good match between the tube sections to be joined together.

Figure 1:
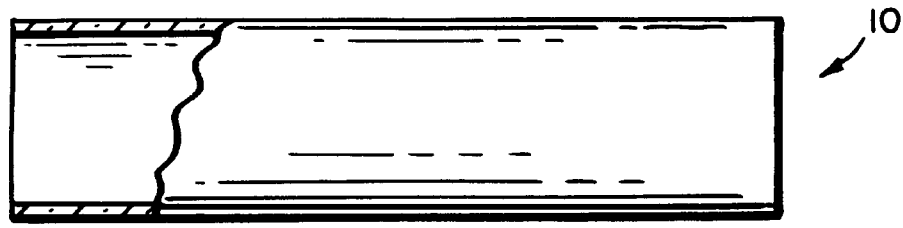
FIGS. 1–4 illustrate a processes for prefabricating a glass tube for joining to another glass tube in accordance with the invention.
Figure 2:
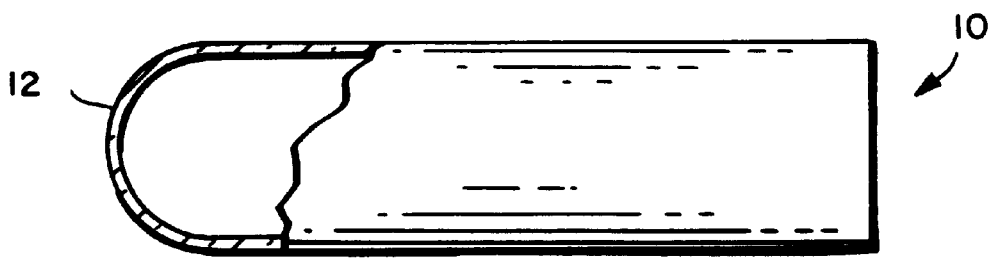

A process for prefabricating a glass tube in preparation for joining the glass tube to another glass tube is described with reference to FIGS. 1–4. The process begins with a straight glass tube 10 of desired diameter, wall thickness and composition. As shown in FIG. 2, a dome 12 is formed on one end of glass tube 10. The dome 12 may be formed by placing the glass tube in a lathe, heating the glass tube in the region where the dome is to be formed, rotating the glass tube and pulling the ends of the glass tube apart. Automated techniques for forming dome 12 are well known to those skilled in the art. Preferably, the dome has a hemispherical shape with a diameter equal to the diameter of glass tube 10. The dome 12 closes one end of glass tube 10.

Figure 3:
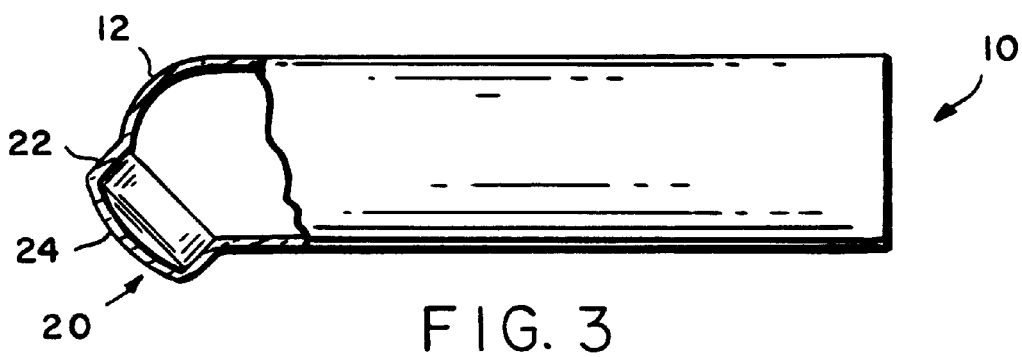

As shown in FIG. 3, the dome 12 is shaped to form a precursor to a rimmed hole. The dome 12 may be shaped using a molding process, such as blow molding, to form a blister 20. The blister 20 includes a rim 22 having a closed end 24. The blister 20 may be formed by heating dome 12 and pressurizing the interior of glass tube 10 so as to force a portion of dome 12 into a mold (not shown) having the shape of blister 20. The mold defines the exterior size and shape of blister 20. The wall thickness of rim 22 is determined by the thickness of dome 12, typically about the same as the wall thickness of glass tube 10.

Figure 4:
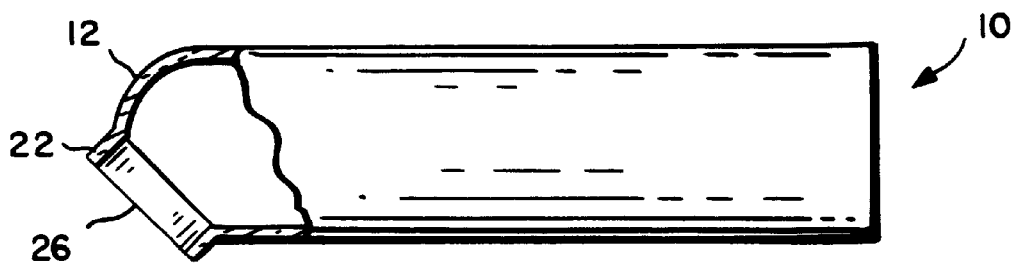

As shown in FIG. 4, the closed end of blister 20 is removed to form a hole 26 defined by rim 22. In a preferred embodiment, the hole 26 is formed through blister 20 by flame cutting. Preferably, the rim 22 comprises a cylindrical wall and defines a circular hole. The rim 22 of hole 26 can be formed in any desired location on dome 12. In order to assure a round rim, the blister 20 must be fully located on dome 12. The degree of freedom in positioning hole 26 depends on the required size of hole 26. A smaller hole may be positioned within a larger solid angle on the dome than a large hole. Nonetheless, the process shown in FIGS. 1–4 and described above provides flexibility with respect to the size and position of hole 26 and its orientation with respect to the axis of glass tube 10. Because rim 22 is molded, its shape and dimensions are well controlled.

Figure 5:
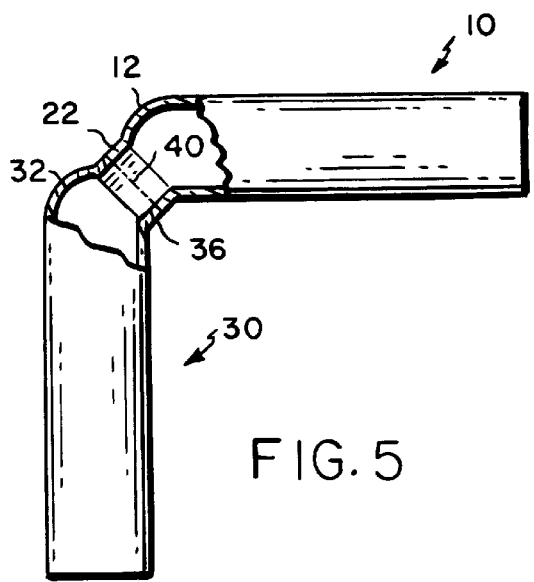
FIG. 5 illustrates the joining of two glass tubes in accordance with the present invention.

The joining of two glass tubes using the procedure of the present invention is illustrated in FIG. 5. A glass tube 30 having a dome 32 and a rim 36 is processed in the same manner as glass tube 10 described above. The rims 22 and 36 have the same diameters, preferably within about 0.2 to 0.3 mm, and the same wall thickness as a result of the molding process used to form the rims. The rims 22 and 36 are aligned within a few degrees and are fused together to form a sealed joint 40. Because the rims 22 and 36 are formed in the same mold, they are closely matched and permit accurate fusing and sealing between tubes 10 and 30. The tubes 10 and 30 typically have the same diameters and wall thicknesses. However, tubes of different dimensions may be joined using the process of the present invention. The principal requirement is that the rims 22 and 36 be sufficiently matched to permit them to be fused together. The fusing of rims 22 and 36 is performed by heating these elements to melting conditions and pressing them together as known in the art.

Figure 6:
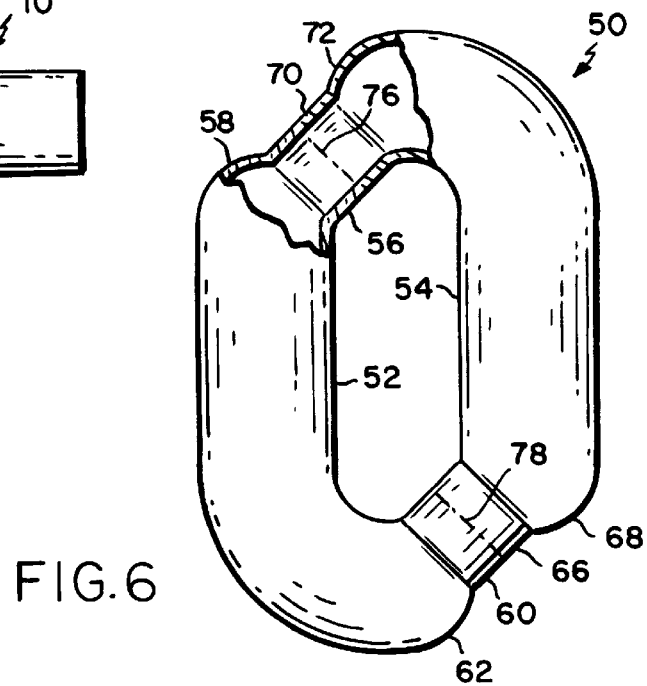
FIGS. 6 and 7 illustrate closed-loop, tubular lamp envelopes fabricated in accordance with the process of the present invention.
Figure 7:
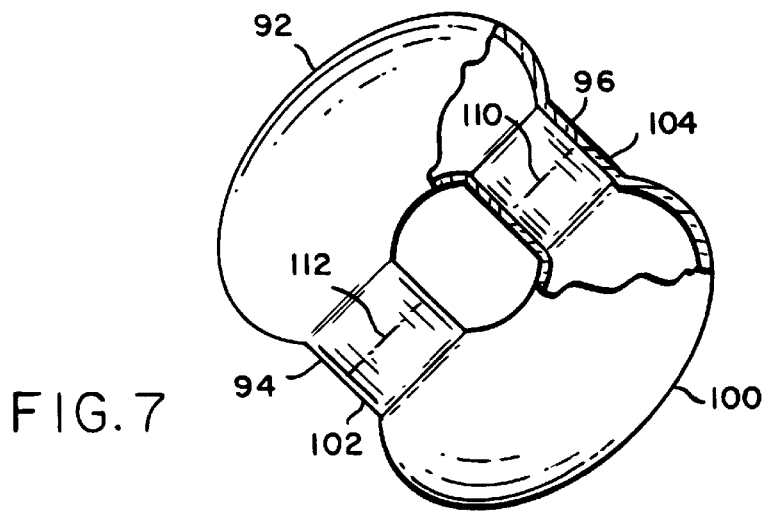

The process shown in FIGS. 1–4 and described above is performed on a straight glass tube having a dome formed at one end. In many cases, it may be desired to bend the glass tube adjacent to dome 12 so that, for example, the plane of rim 22 may be oriented parallel to the axis of glass tube 10. As described below, the process of FIGS. 1–4 can be performed on both ends of two glass tubes, and the two glass tubes can be joined together to form a closed-loop lamp envelope. The described procedure can be used on straight and shaped glass tubing. Using the disclosed process and different tube shapes and sizes, a large variety of lamp configurations can be fabricated. The disclosed procedure permits an extremely flexible manufacturing process, capable of handling different shapes and sizes with very little changeover. Examples of closed-loop, hollow tubular lamp envelopes fabricated in accordance with the present invention are illustrated in FIGS. 6 and 7. In FIG. 6, a lamp envelope 50 is formed by joining glass tubes 52 and 54. In glass tube 52, a rim 56 is formed in a dome 58 at one end of glass tube 52, and a rim 60 is formed in a dome 62 at the other end of glass tube 52. Similarly, a rim 66 is formed in a dome 68 at one end of glass tube 54, and a rim 70 is formed in a dome 72 at the other end of glass tube 54. Each of the glass tubes 52 and 54 is shaped near one end to permit formation of a closed-loop lamp envelope and to provide a desired shape. Rim 56 of glass tube 52 is joined to rim 70 of glass tube 54 at joint 76, and rim 60 of glass tube 52 is joined to rim 66 of glass tube 54 at joint 78 to form the sealed, closed-loop lamp envelope 50.

Figure 8:
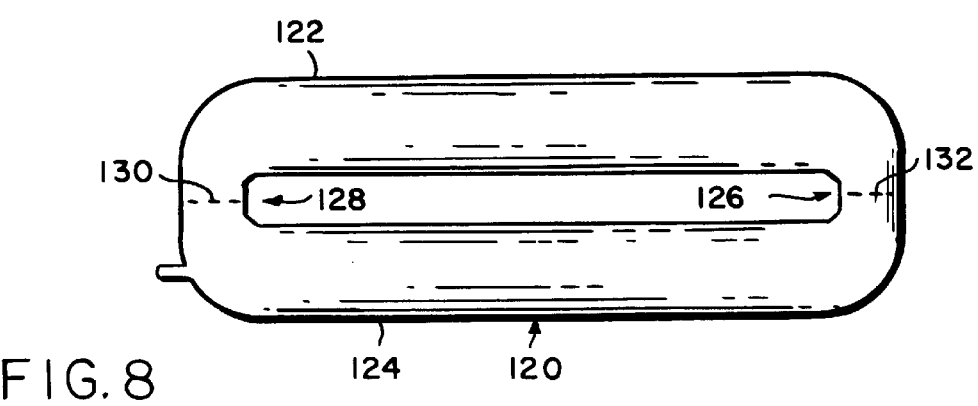
FIG. 8 illustrates one preferred embodiment of a closed-loop, tubular lamp envelope for use in an electrodeless fluorescent lamp.
Figure 9:
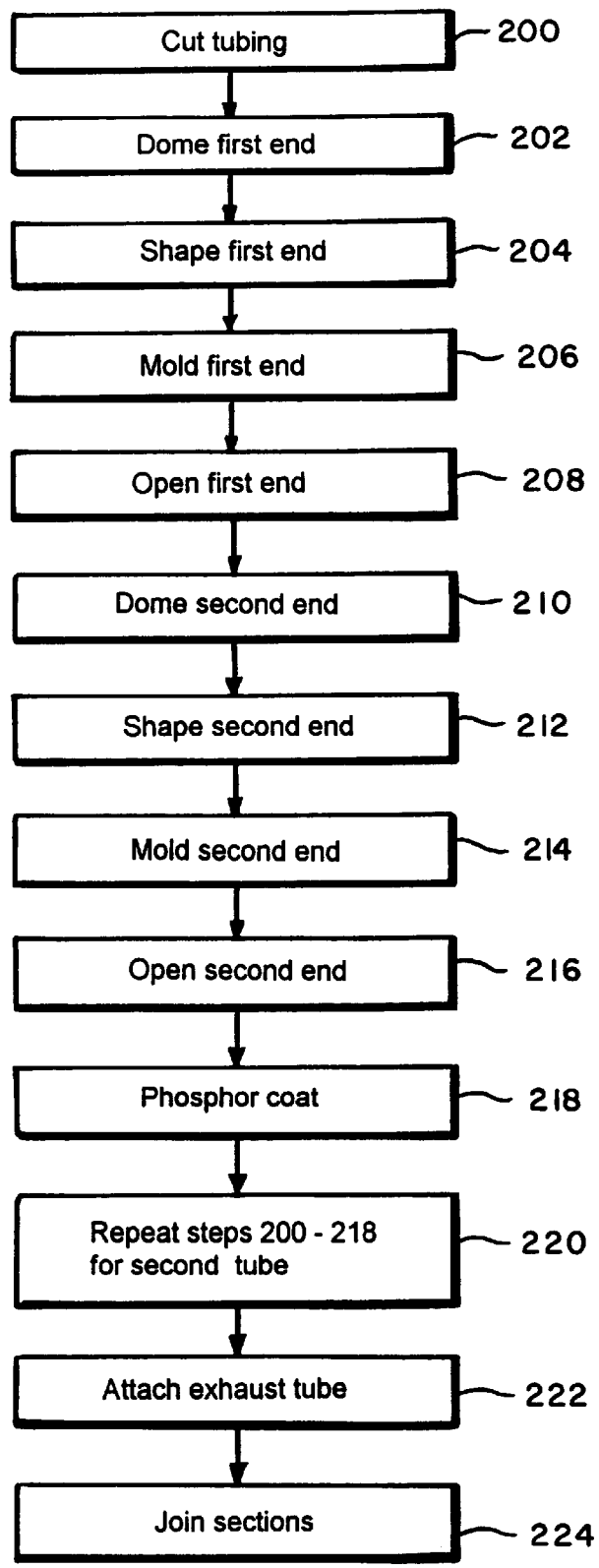
FIG. 9 is a flow chart that illustrates a process for fabricating a closed-loop, tubular lamp envelope in accordance with the present invention.

A lamp envelope 90 having a different shape from lamp envelope 50 but fabricated by the same process is shown in FIG. 7. Glass tube 92 is fabricated with rims 94 and 96, and glass tube 100 is fabricated with rims 102 and 104 as described above. Rim 96 is fused to rim 104 at joint 110, and rim 94 is fused to rim 102 at joint 112 to form the sealed, closed-loop lamp envelope 90. A preferred configuration of a lamp envelope 120 for an electrodeless light source is shown in FIG. 8. The lamp envelope 120 includes glass tubes 122 and 124 joined at or near each end by bridges 126 and 128 to form a closed-loop. Bridges 126 and 128 are formed by integral half bridges on glass tubes 122 and 124. Straight portions of glass tubes 122 and 124 are parallel and spaced apart. The glass tubes 122 and 124 are fused at joints 130 and 132 to form a sealed lamp envelope having a closed-loop discharge path. In one preferred embodiment, the tubes 122 and 124 have outside diameters of 5.0 centimeters and are spaced apart, except at bridges 126 and 128, by 2.8 centimeters. The overall length of the lamp envelope, not including the tubulation, is 40.0 centimeters. The bridges 126 and 128 have outside diameters of 3.4 centimeters.

A process for fabricating a closed-loop, hollow lamp envelope of the type shown in FIG. 8 is described with reference to FIGS. 9 and 10A–10K. It will be understood that this process is generally applicable to fabrication of closed-loop, tubular lamp envelopes of different shapes and sizes. A glass tube 300 (FIG. 10A) is cut to a desired length in step 200. A dome 302 (FIG. 10B) is formed in a first end of glass tube 300 in step 202. The domed end of tube 300 is bent, as indicated at 304 in FIG. 10C, at a 45° angle to the tube axis in step 204. The first 302 is molded using a blow molding procedure to form a blister 306 (FIG.10D) in step 206. The blister is opened to form a hole 308 (FIG. 10E) defined by a rim 310 in step 208. Next, a dome 320 (FIG. 10F) is formed at the second end of tube 300 in step 210. The second end of tube 300 is bent, as indicated at 322 in FIG. 10G, at a 45° angle to the tube axis in step 212. The second end of tube 300 is blow molded to form a blister 324 (FIG. 10H) in step 214. The blister 324 is opened to form a hole 326 (FIG. 10I) defined by a rim 328 in step 216. When the lamp envelope is to be used in a fluorescent lamp, the inside surface of the glass tube 300 is coated with a phosphor material in step 218. More specifically, the lamp tube may be internally coated with an aluminum oxide barrier coating. After oven drying of the barrier coating, the lamp tube is coated with a 3500K triphosphor blend, dried and baked, as is known in the art. The phosphor coating is wiped from the open ends of glass tube 300 in the region adjacent to rims 310 and 328 where the glass seals will be made. Next, steps 200 through 218 are repeated for a second glass tube 340 (FIG. 10K) in step 220. Each of the tubes has a half bridge at each end. One or more exhaust tubes 334 (FIG. 10J) may be attached to either or both of the formed glass tubes. The two formed glass tubes 300 and 340 are fused together at their matching rims on a joining machine to form the closed-loop lamp envelope (FIG. 10K) in step 224.

Lamp exhaust processing is similar to that used for other fluorescent lamps. While heated in an oven to outgas the glass and the phosphors, the lamp envelope is subjected to repeated cycles of flushing with an inert gas and evacuation. The final fill gas, which may be krypton, is preferably introduced at a pressure of 0.2 torr. Doses of mercury and amalgam are introduced, and the exhaust tube 334 is tipped off to provide a completed lamp envelope as shown in FIG. 8.

The precision spacing between the half bridges and the coplanarity of their cut open ends is crucial to the ability to seal the glass tubes together. The rims on the half bridges should be aligned within about 0.2 to 0.3 mm and should be coplanar within a few degrees. The opposite ends of the glass tubes are preferably sealed simultaneously.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A closed-loop, tubular lamp envelope comprising:
   a first light-transmissive tube having first and second domes at opposite ends thereof, the first and second domes of said first tube including first and second rims defining first and second holes, respectively; and
   a second light-transmissive tube having third and fourth domes at opposite ends thereof, the third and fourth domes of said second tube including third and fourth rims defining third and fourth holes, respectively, said first and third rims being joined and said second and fourth rims being joined such that said first and second tubes form a sealed, closed-loop, tubular lamp envelope.

2. A closed-loop, tubular lamp envelope as defined in claim 1 wherein said first and second tubes each include a straight portion having a longitudinal axis, wherein said first and third rims form matching half bridges for joining the straight portions of said first and second tubes near one end and wherein said second and fourth rims form matching half bridges for joining the straight portions of said first and second tubes near the other end.

3. A closed-loop, tubular lamp envelope as defined in claim 1 further including a phosphor coating on inside surfaces of said first and second tubes.

\* \* \* \* \*